United States Patent
Park

(10) Patent No.: US 10,521,501 B2
(45) Date of Patent: Dec. 31, 2019

(54) APPARATUS AND METHOD FOR EDITING TABLE IN TERMINAL

(71) Applicant: Samsung Electronics Co., Ltd., Suwon-si, Gyeonggi-do (KR)

(72) Inventor: Jun-Young Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 14/220,601

(22) Filed: Mar. 20, 2014

(65) Prior Publication Data

US 2014/0289602 A1 Sep. 25, 2014

(30) Foreign Application Priority Data

Mar. 21, 2013 (KR) .......................... 10-2013-0030527

(51) Int. Cl.
*G06F 17/24* (2006.01)
(52) U.S. Cl.
CPC .................................. *G06F 17/245* (2013.01)
(58) Field of Classification Search
CPC ... G06F 17/245; G06F 17/246; G06F 3/04883
USPC ........................................................ 715/227
See application file for complete search history.

(56) References Cited

U.S. PATENT DOCUMENTS 8,773,370 B2 * 7/2014 Hogan ................. G06F 3/04883
345/156
2009/0319882 A1 12/2009 Morrison et al.
2012/0013539 A1 * 1/2012 Hogan ................. G06F 3/04883
345/173
2014/0101612 A1 * 4/2014 Jain ......................... G06F 17/24
715/815

OTHER PUBLICATIONS

Washington State Department of Transportation, "Create Tables," 2010, archived at archive.org and available at: https://www.wsdot.wa.gov/Communications/WebToolKit/Tables.htm.*
Prakash, "Resize Table in Word 2013," 2012, archived at archive.org and available at: http://www.c-sharpcorner.com/UploadFile/8ea152/resize-table-in-word-2013/.*
B., Prakash, "JQuery Table Column Count," 2012, available at: http://csharp-guide.blogspot.com/2012/08/jquery-table-column-count.html.*
Youtube; Pages for iPhone and iPad review; Mar. 16, 2012; https://www.youtube.com/watch?v=H8UB0j7E63c.
Youtube; Catapult CMS Tutorial Video #7: The Table Wizard; Jan. 3, 2011; https://www.youtube.com/watch?v=Uaz2De0sPAo.

(Continued)

*Primary Examiner* — Shawn S Joseph
(74) *Attorney, Agent, or Firm* — Jefferson IP Law, LLP

(57) ABSTRACT

An apparatus and a method for editing a table in a terminal which can edit a table intuitively and easily are provided. The apparatus includes a display unit that simultaneously displays a row number adjusting UI and a column number adjusting UI in a table editing mode, and a controller that performs a control so that a plurality of handlers are displayed on the table when the table displayed in a specific application is selected, a conversion to the table editing mode is performed when a specific handler among the plurality of handlers is selected, and respective UIs that can adjust the number of rows and the number of columns of the table in the table editing mode are simultaneously displayed.

15 Claims, 10 Drawing Sheets

(56) References Cited

OTHER PUBLICATIONS

Naver Blog; [Power Point Course] PowerPoint Table Format; Mar. 13, 2012; https://blog.naver.com/ryopho/1301336626563-1.
Korean Office Action with English translation dated Sep. 18, 2019; Korean Appln. No. 10-2013-0030527.

* cited by examiner

APPARATUS AND METHOD FOR EDITING TABLE IN TERMINAL

PRIORITY

This application claims the benefit under 35 U.S.C. § 119(a) of a Korean patent application filed on Mar. 21, 2013 in the Korean Intellectual Property Office and assigned Serial No. 10-2013-0030527, the entire disclosure of which is hereby incorporated by reference.

BACKGROUND OF THE INVENTION

1. Field of the Invention

The present invention relates to an apparatus and a method for editing a table in a terminal. More particularly, the present invention relates to an apparatus and a method for intuitively and easily editing a table in a terminal.

2. Description of the Related Art

An application such as a document, a note, or a memo is capable of generating or editing a table.

In a process of editing the table, a user may perform a desired operation by making a corresponding selection from a provided pop-up menu.

However, the operation of editing the table using a pop-up menu is not intuitive and it is inconvenient to select individual menus from the pop-up menu for performing a desired editing operation.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for intuitively and easily editing a table in a terminal.

In accordance with an aspect of the present invention, an apparatus for editing a table in a terminal is provided. The apparatus includes a display unit configured to simultaneously display a row number adjusting User Interface (UI) and a column number adjusting UI in a table editing mode, and a controller configured to control so that a plurality of handlers are displayed on the table when the table displayed in a specific application is selected, a conversion to the table editing mode is performed when a specific handler among the plurality of handlers is selected, and respective UIs that can adjust the number of rows and the number of columns of the table in the table editing mode are simultaneously displayed.

In accordance with another aspect of the present invention, a method for editing a table in a terminal is provided. The method includes displaying a plurality of handlers on a table when the table displayed in a specific application is selected, performing a conversion to a table editing mode, when a specific handler is selected among the plurality of handlers, and simultaneously displaying a row number adjusting UI and a column number adjusting UI that can respectively adjust the number of rows and the number of columns on the table in the table editing mode.

The present invention provides an effect of editing a table intuitively and easily by providing an apparatus and a method for editing a table in a terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "terminal" refers to an apparatus that may include a portable terminal or a fixed terminal. The portable terminal is a portable, easy to carry electronic device, which includes a video phone, a cellular phone, a smart phone, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book terminal, a portable Personal Computer (PC) (for example, a Notebook, a Tablet, and the like), a digital camera, and the like. In addition, the fixed terminal may include a desktop PC, and the like.

Figure 1:
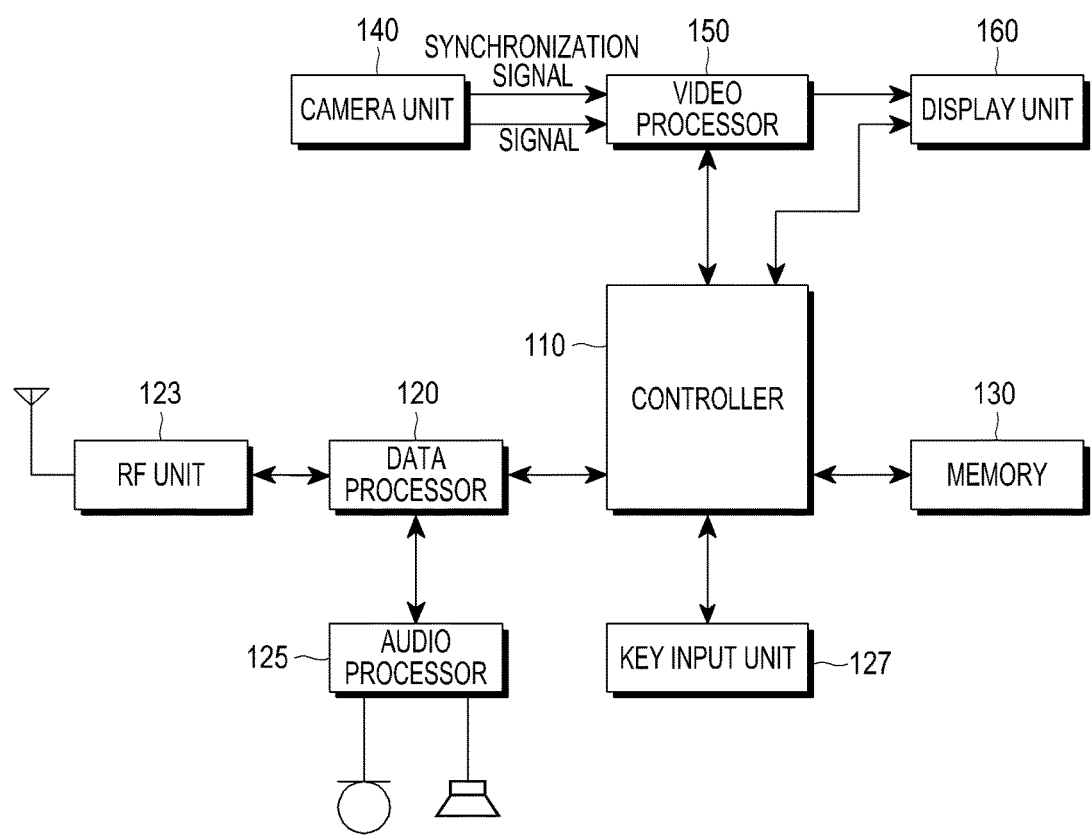
FIG. 1 is a diagram illustrating a configuration of a terminal according to an embodiment of the present invention.

FIG. 1 is a diagram illustrating a configuration of a terminal according to an exemplary embodiment of the present invention.

Referring to FIG. 1, a Radio Frequency (RF) unit 123 performs a wireless communication function of a terminal. The RF unit 123 includes an RF transmitter that up-converts and amplifies a frequency of a signal to be transmitted, an RF receiver that performs low noise amplification on a received signal and down-converts a frequency thereof, and the like. A data processor 120 includes a transmitter that codes and modulates the signal to be transmitted, a receiver that demodulates and decodes the received signal, and the like. That is, the data processor 120 may include a modem and a codec. Here, the codec includes a data codec that processes packet data or the like and an audio codec that processes an audio signal such as a voice. An audio processor 125 reproduces a received audio signal output from the audio codec or transmits an audio signal to be transmitted which is generated from a microphone to the audio codec of the data processor 120.

A key input unit 127 includes keys to input number and character information, and function keys to configure various settings and functions of the terminal A memory 130 may include a program memory, and a data memory. The program memory may store programs that control general operations of the terminal and programs that perform a conversion to a table editing mode based on the selection of a specific handler among a plurality of handlers shown in a table. The program memory also stores one more programs that perform a control so that respective User Interfaces (UIs) that adjust the number of rows and columns of the table in the table editing mode are displayed at the same time. In addition, the data memory temporarily stores data generated in the course of executing the programs.

A controller 110 controls the overall operations of the terminal.

According to embodiments of the present invention, the controller 110 displays a plurality of handlers on the table when a table to be displayed on a specific application is selected, and performs a conversion to the table editing mode when a specific hander among the plurality of handlers is selected. The controller 110 performs a control so that, in the table editing mode, respective UIs adjust the number of rows and the number of columns in the table at the same time.

In addition, the controller 110 may perform a control so that, in the table editing mode, the row number adjusting UI is displayed on the left side or the right side of the table, and the column number adjusting UI is displayed on the upper side or the lower side of the table.

In addition, the controller 110 may perform a control so that, in the table editing mode, the row number adjusting UI is displayed on the left side when the specific handler selected for the conversion to the table editing mode is a handler positioned on the left side among the plurality of handlers displayed in the table. Further, the controller 110 may perform a control so that, in the table editing mode, the column number adjusting UI is displayed on the right side of the table, when the specific handler is a handler positioned on the right side among the plurality of handlers displayed on the table.

At this point, the row number adjusting UI includes a row inserting UI, a row deleting UI, and the number of rows existing in the table. Similarly, the column number adjusting UI includes a column inserting UI, a column deleting UI, and the number of columns existing in the table.

In addition, the row number adjusting UI includes a row inserting UI, a row deleting UI, the number of rows existing on the table, and the maximum number of rows that can be inserted, and the column number adjusting UI includes a column inserting UI, a column deleting UI, the number of columns existing in the table, and the maximum number of columns that can be inserted.

In addition, according to a first embodiment of the present invention, the controller 110 may perform a control so that the number of rows is adjusted in the table based on a standard when the row number adjusting UI is selected in the table editing mode. Further, the controller 110 may perform a control so that the number of columns is adjusted in the table based on the standard when the column number adjusting UI is selected in the table editing mode.

In addition, according to the first embodiment of the present invention, when a specific portion of the table is selected in the table editing mode, the controller 110 may determine whether the specific portion is selected to include the specific row or the specific column of the table. The controller 110 performs a control so that the number of rows is adjusted based on the specific row, if the row number adjusting UI is selected, when the specific row is selected, and the number of columns is adjusted based on the specific column, if the column number adjusting UI is selected, when the specific column is selected.

At this point, the controller 110 performs control so that the column number adjusting UI is deactivated when the specific row is selected, and the row number adjusting UI is deactivated when the specific column is selected.

In addition, according to a second embodiment of the present invention, the controller 110 may perform control so that the number of rows is adjusted based on the specific row in which data exists, if data exists in the table, when the row number adjusting UI is selected in the table editing mode. Otherwise, the controller 110 may perform control so that the number of columns is adjusted based on the specific column in which data exist, if data exists in the table, when the column number adjusting UI is selected in the table editing mode.

A camera unit 140 includes a camera sensor that captures video data, and converts a captured light signal into an electric signal and a signal processor that converts the analog video signal captured by the camera sensor into digital data. Here, it is assumed that the camera sensor is a Charge Coupled Device (CCD) or a Complementary Metal Oxide Semiconductor (CMOS) sensor, and the signal processor may be implemented by a Digital Signal Processor (DSP). Further, the camera sensor and the signal processor may be implemented in an integrated manner or a separated manner.

A video processor 150 performs Image Signal Processing (ISP) that displays a video signal output from the camera unit 140 to the display unit 160, and the ISP may perform a function such as gamma correction, interpolation, a spatial change, an image effect, image scale, AWB, AE, or AF. Therefore, the video processor 150 processes video signals output from the camera unit 140 frame by frame, and outputs the frame video data according to the characteristics and sizes of the display unit 160. In addition, the video processor 150 includes a video codec, and performs a function of compressing the frame video data displayed on the display unit 160 by a scheme, or decompressing the compressed frame video data into the original frame video data. Here, the video codec may be a JPEG codec, an MPEG4 codec, a Wavelet codec, or the like. It is assumed that the video processor 150 includes an On Screen Display (OSD) function, and the video codec may output OSD data according to the size of the screen displayed by the control of the controller 110.

The display unit 160 displays a video signal output from the video processor 150 on a screen, and displays user data output from the controller 110. Here, the display unit 160 may use a Liquid Crystal Display (LCD), and in this case, the display unit 160 may include an LCD controller, a memory that stores video data, an LCD display element, or the like. Here, if the LCD is implemented by a touch screen scheme, the LCD may be performed as an input unit, and at this point, the display unit 160 may display keys like the key input unit 127.

Further, as the display unit 160 is implemented in a touch screen scheme, if the display unit 160 is used as a touch screen unit, the touch screen unit is configured with a Touch Screen Panel (TSP) including a plurality of sensor panels, and the plurality of sensor panels may include a capacitive sensor panel that can recognize a finger touch, or an electromagnetic induction touch panel that can recognize a minute touch like an electronic pen.

In addition, the display unit 160 displays a plurality of handlers on the table based on the selection on the table displayed on the specific application according to an embodiment of the present invention, and simultaneously displays the row number adjusting UI and the column number adjusting UI in the table editing mode.

An operation of editing a table on the terminal as above will be described with reference to FIGS. 2A to 7B.

Figure 2A:
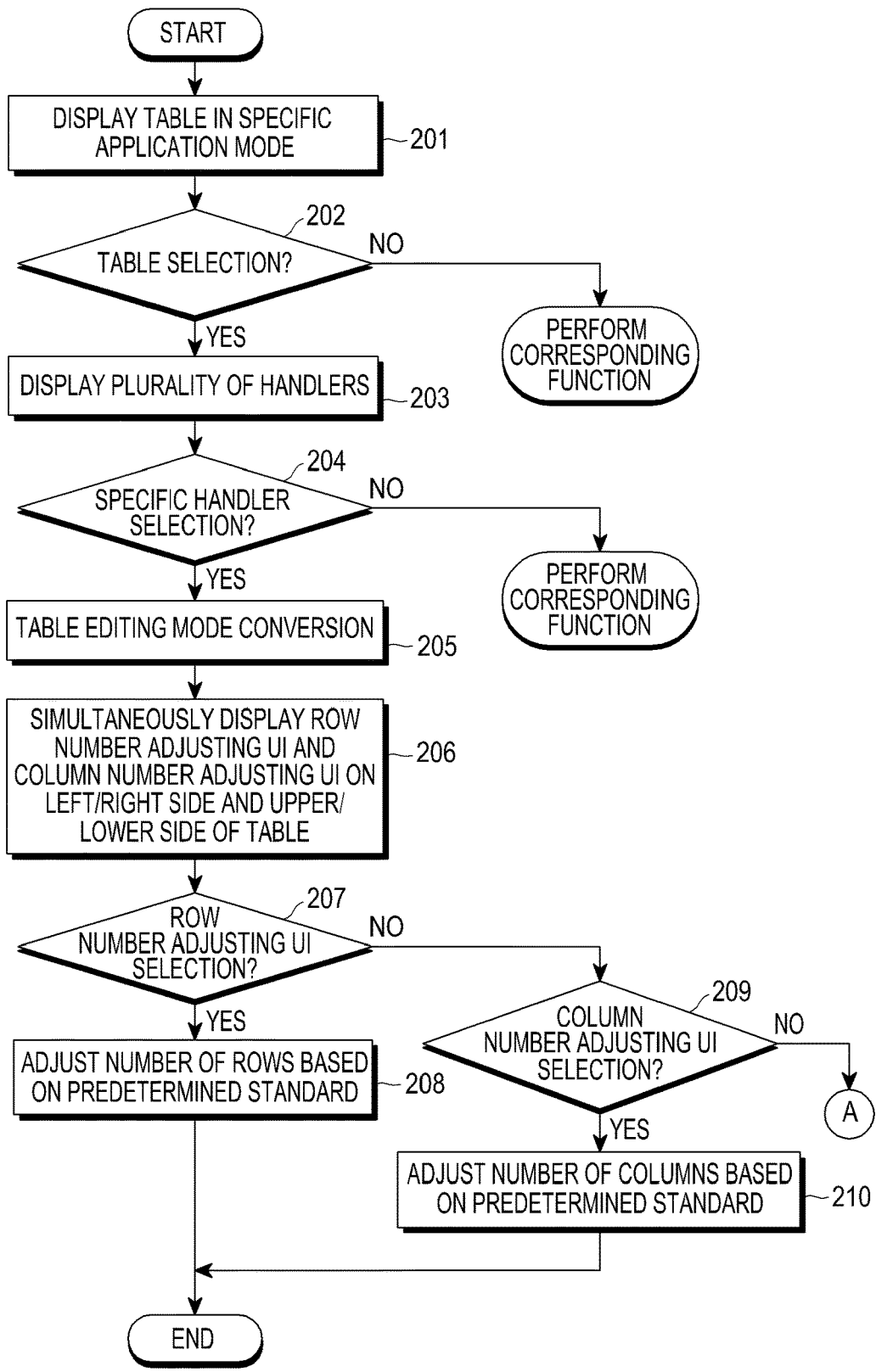
FIGS. 2A and 2B are flowcharts illustrating table editing processes in a terminal according to a first embodiment of the present invention.
Figure 2B:
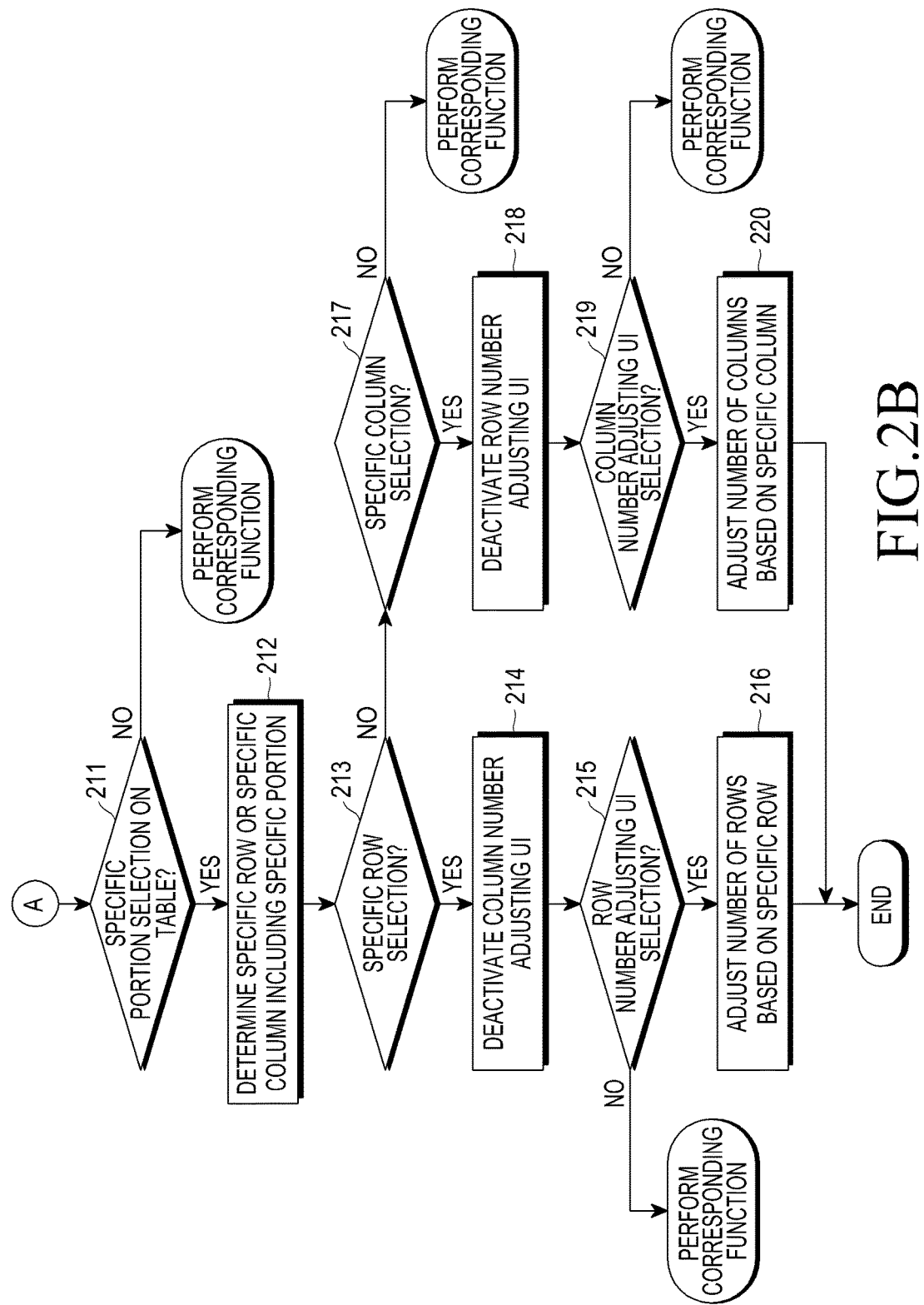

FIGS. 2A and 2B are flowcharts illustrating table editing processes in a terminal according to the first embodiment of the present invention.

Hereinafter, the embodiment of the present invention will be described with reference to FIG. 1.

Referring to FIGS. 2A and 2B, in operation 201 of displaying a table generated in a specific application mode in which a table is generated and displayed, if the table is selected, the controller 110 detects the selection in operation 202, and proceeds to operation 203 of displaying a plurality of handlers on the table.

While the plurality of handlers are displayed on the table, if a specific handler is selected, the controller 110 detects the selection in operation 204, and proceeds to operation 205 of performing a conversion to a table editing mode.

In the table editing mode, the controller 110 proceeds to operation 206 of displaying a row number adjusting UI on the left side or the right side of the table and displaying a column number adjusting UI on the upper side or the lower side of the table at the same time.

In operation 206, positions where the row number adjusting UI and the column number adjusting UI are displayed may be determined in advance, for example, the right side and the lower side of the table.

Otherwise, in operation 206, the row number adjusting UI may be displayed on the left side or the right side of the table according to the position of the specific handler selected in operation 204. If the specific handler selected in operation 204 is positioned on the left side of the table, the row number adjusting UI is displayed on the left side of the table in the table editing mode. However, if the specific handler selected in operation 204 is positioned on the right side of the table, the row number adjusting UI is displayed on the right side of the table in the table editing mode.

Therefore, based on the position of the specific handler selected by a user among the plurality of handlers displayed on the table, the row number adjusting UI may be displayed on the right side of the table for a right-handed user, or may be displayed on the left side of the table for a left-handed user.

While the row number adjusting UI is displayed on the left side or the right side of the table in the table editing mode, and the column number adjusting UI is displayed on the upper side or the lower side of the table, if the row number adjusting UI is selected, the controller 110 detects the selection in operation 207, and proceeds to operation 208 of adjusting the number of rows based on the predetermined standard.

When the standard with respect to the row of the table is the last row, if insertion is selected in the row number adjusting UI, the controller 110 inserts a new row after the last row in operation 208, and if deletion is selected in the row number adjusting UI, the controller 110 performs control of deleting the last row.

Otherwise, while the row number adjusting UI is displayed on the left side or the right side of the table in the table editing mode, and the column number adjusting UI is displayed on the upper side or the lower side of the table, if the column number adjusting UI is selected, the controller 110 detects the selection in operation 209, and proceeds to operation 210 of adjusting the number of columns based on the standard.

When the standard with respect to the row of the table is the last column, if insertion is selected in the column number adjusting UI, the controller 110 inserts a new column after the last column in operation 210, and if deletion is selected in the column number adjusting UI, the controller 110 performs a control of deleting the last column.

Otherwise, while the row number adjusting UI is displayed on the left side or the right side of the table in table editing mode, and the column number adjusting UI is displayed on the upper side and the lower side of the table, if a specific portion of the table is selected, the controller 110 detects the selection in operation 211, and proceeds to operation 212 of determining a specific row or a specific column including the specific portion of the table.

As a result of the determination, if the specific portion includes the specific row, the selection of the specific row is detected in operation 213, and the process proceeds to operation 214 of deactivating the column number adjusting UI not to be used. Further, if the row number adjusting UI is selected, the controller 110 detects the selection in operation 215, and proceeds to operation 216 of adjusting the number of rows based on the specific row.

If insertion is selected on the row number adjusting UI, the controller 110 inserts a new row after the specific row, and if deletion is selected on the row number adjusting UI, the controller 110 performs a control of deleting the specific row.

Otherwise, as a result of the determination, if the specific portion includes the specific column, the selection of the specific column is detected in operation 217, and the process proceeds to operation 218 of deactivating the row number adjusting UI not to be used. Further, if the column number adjusting UI is selected, the controller 110 detects the selection in operation 219, and proceeds to operation 220 of adjusting the number of columns based on the specific column.

If insertion is selected in the column number adjusting UI, the controller 110 inserts a new column after the specific column, and if deletion is selected in the column number adjusting UI, the controller 110 performs a control of deleting the specific column.

In an embodiment, the deactivation of the row number adjusting UI in operation 214, and the deactivation of the column number adjusting UI in operation 218 may not be performed.

The processes in FIGS. 2A and 2B are described with reference to FIGS. 3A to 5B as follows.

Figure 3A:
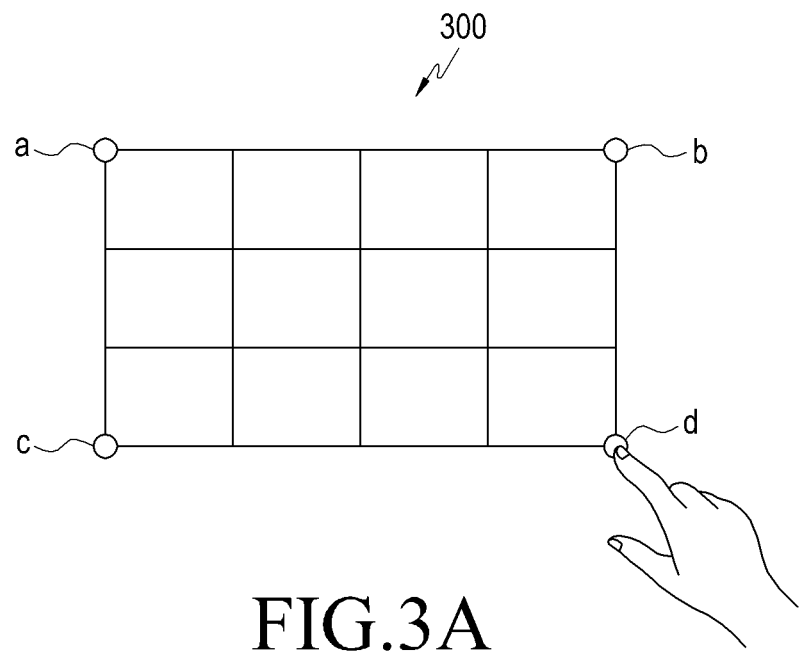
FIGS. 3A to 3D, and 4A to 4D are diagrams illustrating operations of adjusting the number of rows and the number of columns based on a standard in a table editing mode of a terminal according to the first embodiment of the present invention.
Figure 3B:
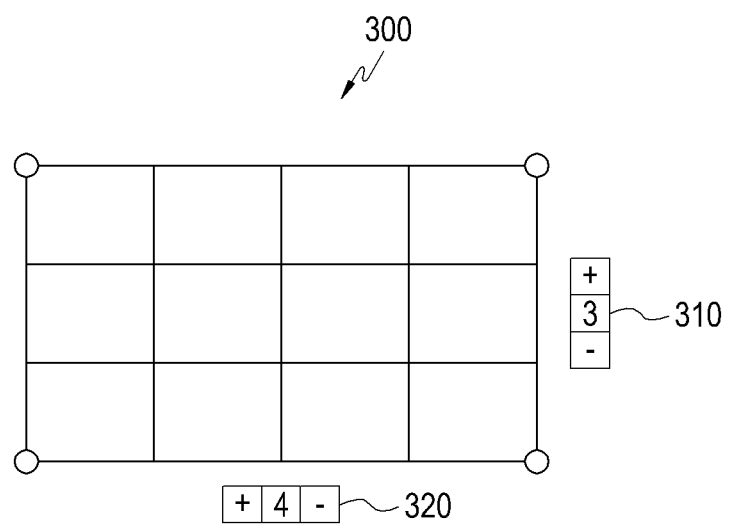

First, with reference to FIGS. 3A to 3D, if a table is selected in a specific application mode, a plurality of handlers a, b, c, and d are displayed on the table 300 as illustrated in FIG. 3A. Among the plurality of handlers a, b, c, and d, if the specific handler d positioned on the right side of the table is selected, a row number adjusting UI 310 is displayed on the right side of the table as illustrated in FIG. 3B and a column number adjusting UI 320 is displayed on the lower portion of the table for a right-handed user.

Figure 3C:
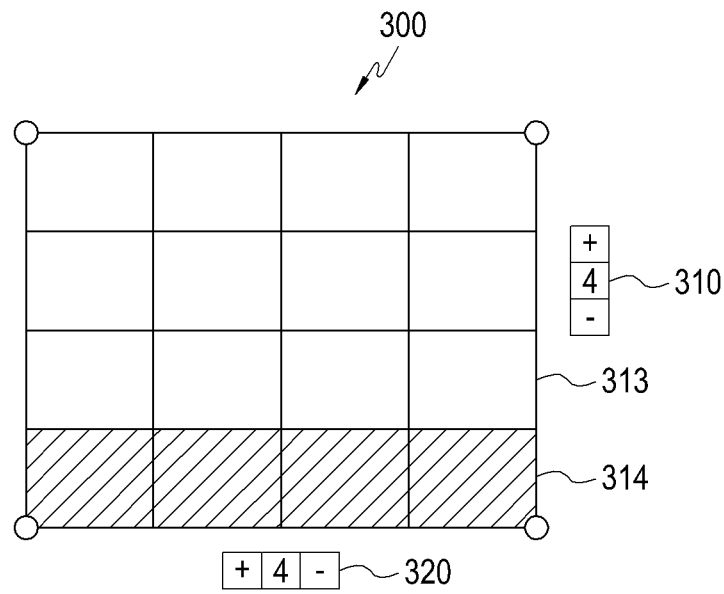

If insertion "+" in the row number adjusting UI 310 of FIG. 3B is selected, a new row 314 is inserted after the last row 313 based on the standard as illustrated in FIG. 3C. Otherwise, if deletion "−" in the row number adjusting UI 310 of FIG. 3B is selected, the last row 313 is deleted based on the standard.

Figure 3D:
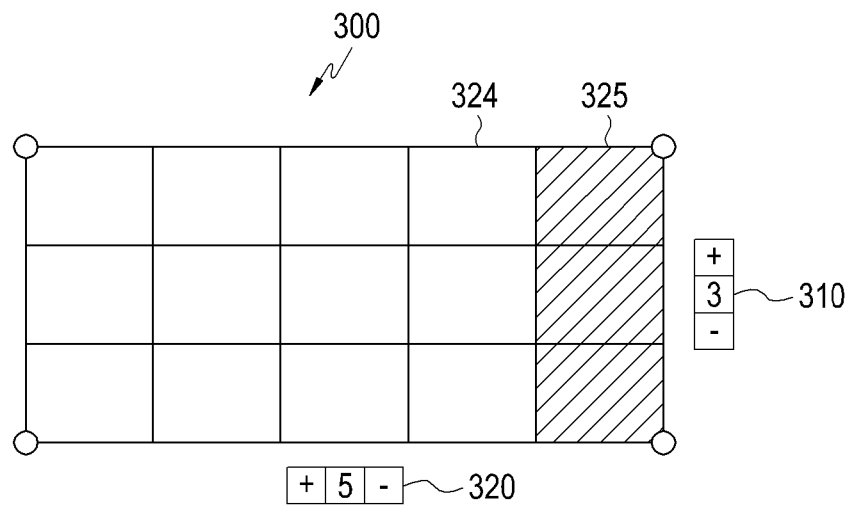

Further, if insertion "+" in the column number adjusting UI 320 of FIG. 3B is selected, a new column 325 is inserted after the last column 324 based on the standard as illustrated in FIG. 3D. Otherwise, if deletion "−" in the column number adjusting UI 320 of FIG. 3B is selected, the last column 324 is deleted based on the standard.

Figure 4A:
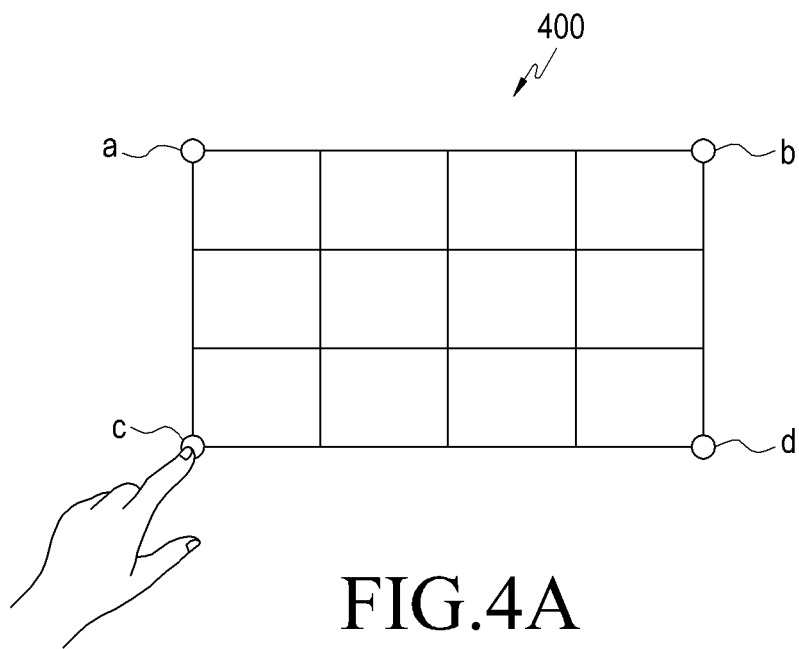
Figure 4B:
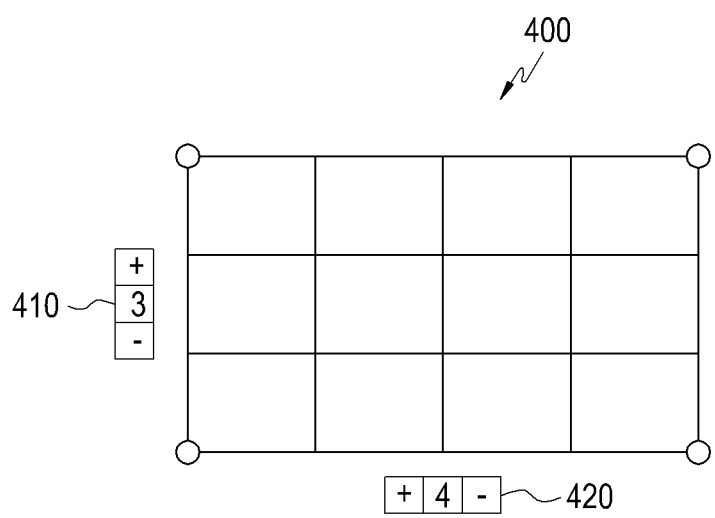

FIGS. 4A to 4D are described as follows. If a table is selected in a specific application mode, a plurality of handlers a, b, c, and d are displayed on a table 400 as illustrated in FIG. 4A. Among the plurality of handlers a, b, c, and d, if a specific handler c positioned on the left side of the table is selected, a row number adjusting UI 410 is displayed on the left side of the table as illustrated in FIG. 4B, and a column number adjusting UI 420 is displayed on the lower side of the table for a left-handed user.

Figure 4C:
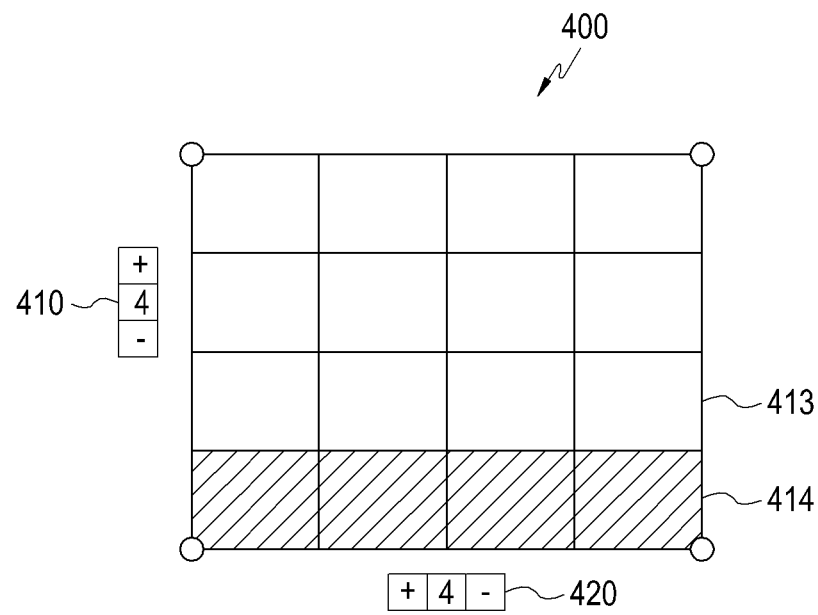

If insertion "+" in the row number adjusting UI 410 of FIG. 4B is selected, a new row 414 is inserted after the last row 413 based on the standard as illustrated in FIG. 4C. Otherwise, deletion "−" in the row number adjusting UI 410 of FIG. 4B is selected, the last row 413 is deleted based on the standard.

Figure 4D:
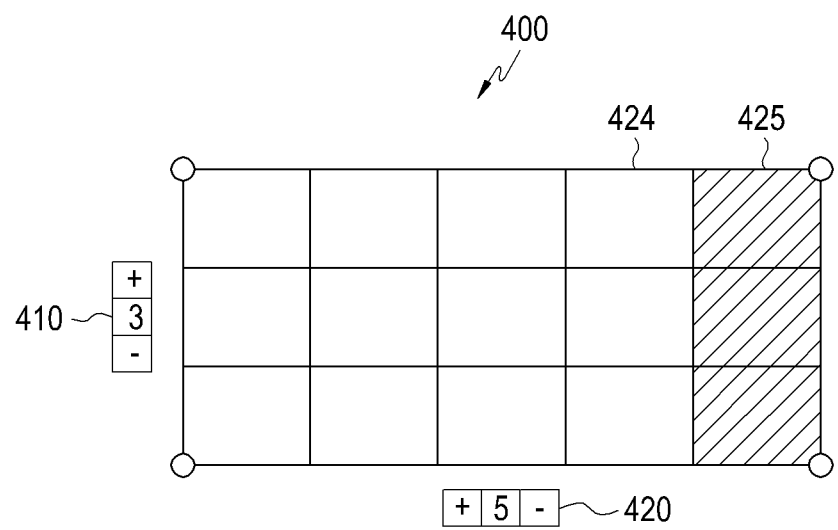

Further, if insertion "+" in the column number adjusting UI 420 of FIG. 4B is selected, a new column 425 is inserted after the last column 424 based on the standard as illustrated in FIG. 4D. Otherwise, if deletion "−" in the column number adjusting UI 420 of FIG. 4B is selected, the last column 424 is deleted based on the standard.

Figure 5A:
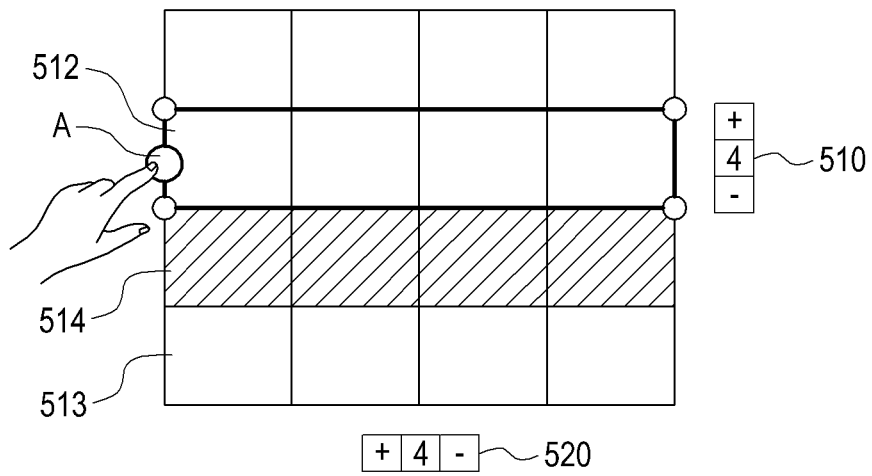
FIGS. 5A and 5B are diagrams illustrating operations of adjusting the number of rows and the number of columns based on a specific row and a specific column in a table editing mode of the terminal according to the first embodiment of the present invention.

Further, after a specific portion A is selected in the table editing mode as illustrated in FIG. 5A, if insertion "+" in a row number adjusting UI 510 is selected, a new row 514 is inserted after the specific row 512 in which the specific portion A is included and before the subsequent row 513. Otherwise, after the specific portion A of the table is selected, if deletion "−" in the row number adjusting UI 510 is selected, the specific row 512 in which the specific portion A is included is deleted.

Figure 5B:
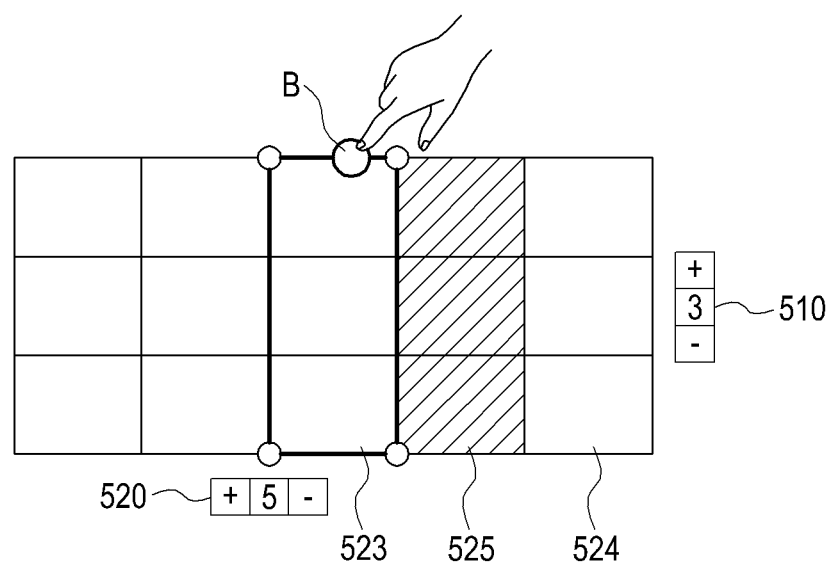

Otherwise, after a specific portion B of the table in the table editing mode is selected as illustrated in FIG. 5B, if insertion "+" in a column number adjusting UI 520 is selected, a new column 525 is inserted after a specific column 523 in which the specific portion B is included and before the subsequent column 524. Otherwise, after the specific portion B of the table is selected, if deletion "−" in the column number adjusting UI 520 is selected, the specific column 523 in which the specific portion B is included is deleted.

Figure 6:
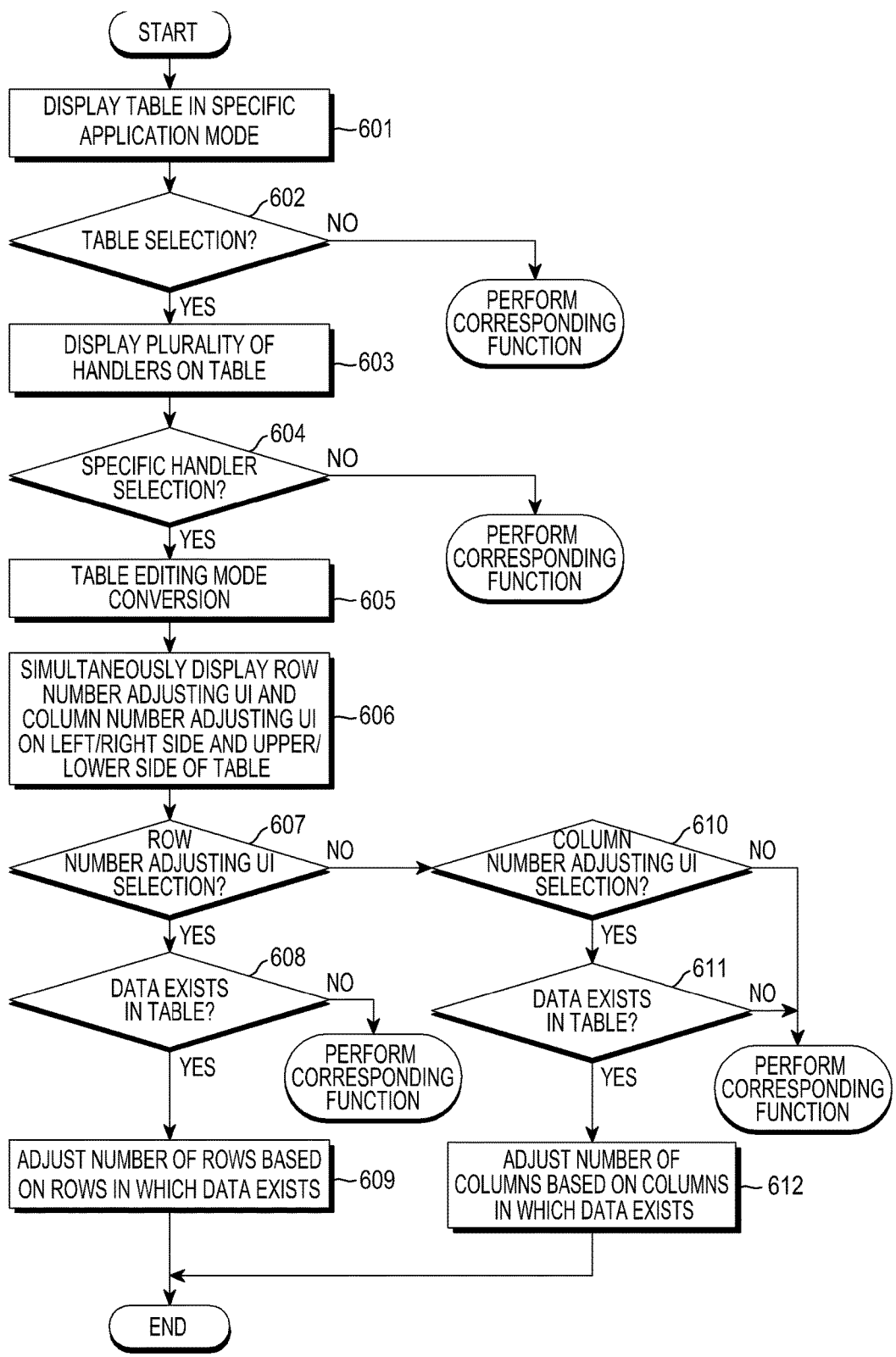
FIG. 6 is a flowchart illustrating a table editing process in a terminal according to a second embodiment of the present invention.

FIG. 6 is a flowchart illustrating a table editing process in a terminal according to the second embodiment.

Hereinafter, an embodiment of the present invention is described with reference to FIG. 1.

Referring to FIG. 6, in operation 601 of displaying a table generated in a specific application mode in which a table is generated and displayed, if a table is selected, the controller 110 detects the selection in operation 602, and proceeds to operation 603 of displaying the plurality of handlers on the table.

While the plurality of handlers are displayed on the table, if a specific handler is selected, the controller 110 detects the selection in operation 604, and proceeds to operation 605 of performing a conversion to a table editing mode.

In the table editing mode, the controller 110 proceeds to operation 606 of displaying the row number adjusting UI on the left side or the right side of the table, and simultaneously displaying the column number adjusting UI on the upper side or the lower side of the table.

In operation 606, a position where the row number adjusting UI and the column number adjusting UI is displayed may be determined in advance, for example, the right side and the lower side of the table.

Further, in operation 606, the row number adjusting UI may be displayed on the left side or the right side of the table according to the position of the specific handler selected in operation 604. If the specific handler selected in operation 604 is positioned on the left side of the table, the row number adjusting UI is displayed on the left side of the table in the table editing mode. However, if the specific handler selected in operation 604 is positioned on the right side of the table, the row number adjusting UI is displayed on the right side of the table in the table editing mode.

Therefore, based on the position of the specific handler selected by a user among a plurality of handlers displayed on the table, the row number adjusting UI is displayed on the right side of the table for a right-handed user, or the row number adjusting UI may be displayed on the left side of the table for a left-handed user.

While the row number adjusting UI is displayed on the left side or the right side of the table in the table editing mode, the column number adjusting UI is displayed on the upper side or the lower side of the table, if the row number adjusting UI is selected, the controller 110 detects the selection in operation 607, and determines whether data exists in the table.

If data exists in the table, the controller 110 detects the existence of data in operation 608, and proceeds to operation 609 of adjusting the number of rows based on the column in which the data exists in the table.

In operation 607, if insertion is selected in the row number adjusting UI, in operation 609 the controller 110 inserts a new row after a column in which the data exists, and if deletion is selected in the row number adjusting UI in operation 607, the controller 110 performs a control of deleting the column in which the data exists.

Otherwise, while the row number adjusting UI is displayed on the left side or the right side in the table editing mode and the column number adjusting UI is displayed on the upper side or the lower side of the table, if the column adjusting UI is selected, the controller 110 detects the selection in operation 610, and determines whether data exists in the table.

If data exists in the table, the controller 110 detects the existence in operation 611, and proceeds to operation 612 of adjusting the number of columns based on the column in which data exists in the table.

If insertion is selected in the column number adjusting UI in operation 610, the controller 110 inserts a new column after the column in which the data exists in operation 612, and if deletion is selected in the column number adjusting UI, the controller 110 performs a control of deleting the column in which data exists.

The process of FIG. 6 is described with reference to FIGS. 7A and 7B.

Figure 7A:
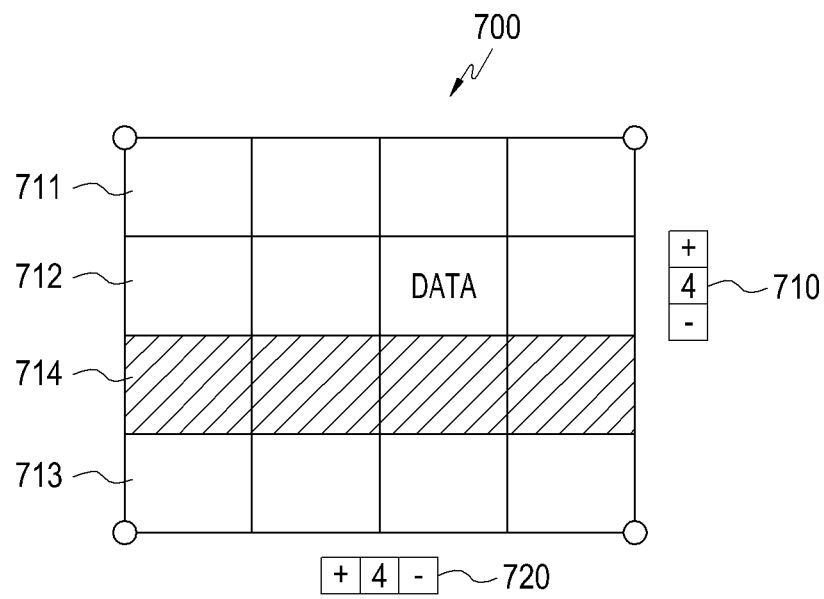
FIGS. 7A and 7B are diagrams illustrating operations of adjusting the number of rows and the number of columns based on a specific row and a specific column in which data is included in a table editing mode of the terminal according to the second embodiment of the present invention.

In a state where a row number adjusting UI 710 is displayed on the right side of a table 700 in the table editing mode and a column number adjusting UI 720 is displayed on the lower portion of the table 700, if insertion "+" in the row number adjusting UI 710 is selected, a new row 714 is inserted after a specific row 712 in which data exists as illustrated in FIG. 7A. Otherwise, if deletion "−" in the row number adjusting UI 710 of FIG. 7A is selected, deletion of a specific row among the columns 711, 714, and 713 in which data does not exist in the table 700 is performed based on the standard. For example, in FIG. 7A, the first row 711 may be deleted. Further, when data exists in all the rows of the table, if deletion "−" in the row number adjusting UI 710 is selected, deletion may be performed from the last row. Therefore, when data exists in all the rows of the table in FIG. 7A, if deletion "−" in the row number adjusting UI 710 is selected, the last row 713 may be deleted.

Figure 7B:
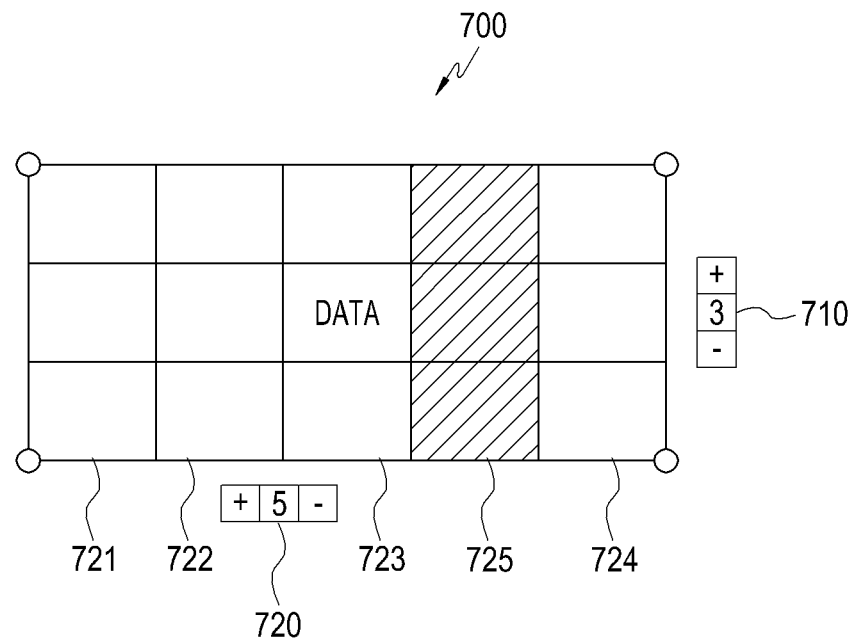

Otherwise, in a state where the row number adjusting UI 710 is displayed on the right side of the table 700 in the table editing mode and the column number adjusting UI 720 is displayed on the lower portion of the table 700, if insertion "+" in the column number adjusting UI 720 is selected, a new column 725 is inserted after the specific column 723 in which data exists as illustrated in FIG. 7B. Otherwise, if deletion "−" in the column number adjusting UI 720 of FIG. 7B is selected, among columns 721, 722, 725, and 724 in which data does not exist in the table 700, deletion of a specific column is performed based on the standard. For example, in FIG. 7B, the first column 721 may be deleted. Further, when data exists in all the columns of the table, if deletion "−" in the column number adjusting UI 720 is selected, deletion may be performed from the last column. Therefore, when data exists all the columns of the table in FIG. 7B, if deletion "−" in the column number adjusting UI 720 is selected, the last column 724 may be deleted.

In embodiments of the present invention, positions of the row inserting UI "+" and the row deleting UI "−" displayed in the row number adjusting UI 310 may be changed, and positions of the column inserting UI "+" and the column deleting UI "−" displayed in the column number adjusting UI 320 may be changed.

An apparatus for editing a table in a terminal and a method thereof according to the present invention may be implemented by a computer-readable code on a computer-readable recording medium. The computer-readable recording medium includes any kinds of recording devices in which data that is readable by a computer system is stored. An example of the recording medium may be ROM, RAM, an optical disc, a magnetic tape, a floppy disc, a hard disc, and a non-volatile memory, and may include the implementation in the form of carrier wave (for example, transmission through the Internet). In addition, the computer-readable recording medium may be distributed to computer systems connected by network so that the computer-readable codes are stored and executed in a dispersed manner.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for editing a table in a terminal, the apparatus comprising:
    a display unit configured to display a row number adjusting User Interface (UI) and a column number adjusting UI in a table editing mode; and
    a controller configured to:
        display a plurality of handlers used to determine a position of the row number adjusting UI and the column number adjusting UI over the table in response to selecting the table displayed,
        determine the position of the row number adjusting UI and the column number adjusting UI corresponding to a specific handler selected among the plurality of handlers,
        perform a conversion to the table editing mode according to selection of the specific handler,
        display the row number adjusting UI and the column number adjusting UI that can respectively adjust a number of rows and a number of columns of the table in the table editing mode,
        receive a user input with respect to the row number adjusting UI or the column number adjusting UI,
        in response to the reception of the user input, determine whether data is in the table, and
        in response to the determining that the data is in the table:
            insert a new row after a row in which the data exists when the user input is received with respect to the row number adjusting UI, and
            insert a new column after a column in which the data exists when the user input is received with respect to the column number adjusting UI.

2. The apparatus according to claim 1,
    wherein the controller is further configured to control in the table editing mode so that the row number adjusting UI is displayed on one of a left side and a right side of the table, and
    wherein the column number adjusting UI is displayed on one of an upper side and a lower side of the table.

3. The apparatus according to claim 1,
    wherein the row number adjusting UI comprises a row inserting UI, a row deleting UI, and the number of rows existing in the table, and the column number adjusting UI comprises a column inserting UI, a column deleting UI, and the number of columns existing in the table.

4. The apparatus according to claim 1,
wherein the controller is further configured to control so that the row number adjusting UI is displayed on a left side of the table in the table editing mode while the specific handler is positioned on the left side among the plurality of handlers displayed on the table, and
wherein the column number adjusting UI is displayed on a right side of the table in the table editing mode while the specific handler is positioned on the right side among the plurality of handlers displayed on the table.

5. The apparatus according to claim 1, wherein the controller is further configured to:
adjust the number of rows in the table based on a standard in response to selecting the row number adjusting UI in the table editing mode, and
adjust the number of columns in the table based on the standard in response to selecting the column number adjusting UI in the table editing mode.

6. The apparatus according to claim 1, wherein the controller is further configured to:
determine whether a specific portion of the table is selected to include a specific row or a specific column of the table according to selection of the specific portion of the table in the table editing mode,
adjust the number of rows based on the specific row according to selection of the row number adjusting UI and selection of the specific row, and
adjust the number of columns based on the specific column according to selection of the column number adjusting UI and selection of the specific column.

7. The apparatus according to claim 6, wherein the controller is further configured to control so that:
the column number adjusting UI is deactivated according to selection of the specific row, and
the row number adjusting UI is deactivated according to selection of the specific column.

8. A method for editing a table in a terminal, the method comprising:
displaying a plurality of handlers used to determine a position of a row number adjusting User Interface (UI) and a column number adjusting UI over a table in response to selecting the table;
determining the position of the row number adjusting UI and the column number adjusting UI corresponding to a specific handler selected among the plurality of handlers and performing a conversion to a table editing mode; and
displaying the row number adjusting UI and the column number adjusting UI that can respectively adjust a number of rows and a number of columns on the table in the table editing mode;
receiving a user input with respect to the row number adjusting UI or the column number adjusting UI;
in response to the reception of the user input, determining whether data is in the table; and
in response to the determining that the data is in the table:
inserting a new row after a row in which the data exists when the user input is received with respect to the row number adjusting UI, and
inserting a new column after a column in which the data exists when the user input is received with respect to the column number adjusting UI.

9. The method according to claim 8,
wherein the row number adjusting UI is displayed on one of a left side or a right side of the table in the table editing mode, and
wherein the column number adjusting UI is displayed on one of an upper side or a lower side of the table.

10. The method according to claim 8,
wherein the row number adjusting UI comprises a row inserting UI, a row deleting UI, and the number of rows existing in the table, and
wherein the column number adjusting UI comprises a column inserting UI, a column deleting UI, and the number of columns existing in the table.

11. The method according to claim 8, wherein the displaying of the UI in the table editing mode comprises:
displaying the row number adjusting UI on a left side of the table in the table editing mode while the specific handler is positioned on a left side of the table; and
displaying the column number adjusting UI on a right side of the table in the table editing mode while the specific handler is positioned on a right side of the table.

12. The method according to claim 8, further comprising:
adjusting the number of rows in the table based on a standard in response to selecting the row number adjusting UI in the table editing mode; and
adjusting the number of columns in the table based on a standard in response to selecting the column number adjusting UI in the table editing mode.

13. The method according to claim 8, further comprising:
determining whether a specific portion of the table is selected to include a specific row or a specific column of the table in response to selecting the specific portion in the table editing mode;
adjusting the number of rows based on the specific row according to selection of the row number adjusting UI, and selection of the specific row, and
adjusting the number of columns based on the specific column according to selection of the column number adjusting UI and selection of the specific column.

14. The method according to claim 13,
wherein the column number adjusting UI is deactivated according to selection of the specific row, and
wherein the row number adjusting UI is deactivated according to selection of the specific column.

15. A non-transitory computer-readable storage medium storing instructions that, when executed, cause at least one processor to perform the method of claim 8.

* * * * *